United States Patent Office 3,178,273
Patented Apr. 13, 1965

3,178,273
METHOD OF PRODUCING TOOL SURFACE LAY-
ERS CONTAINING DIAMOND PARTICLES
Herbert Libal, Karlstrasse 33, Plochingen
(Neckar), Germany
No Drawing. Filed Jan. 4, 1962, Ser. No. 164,417
Claims priority, application Germany, Jan. 7, 1961,
F 32,917; Dec. 29, 1961, F 35,680
10 Claims. (Cl. 51—293)

The present invention relates to the manufacture of implements and tools, such as grinding, cutting, or boring tools, which have diamond powder containing surfaces. Such tools usually comprise a carrier member of any suitable metal, such as steel, and a working surface wherein the diamond particles are embedded in a bonding material.

Synthetic resin lacquers have been used as bonding material for the diamond particles but bonding metals, such as copper and copper alloys, steel and steel alloys, or high-melting metals, such as tungsten and tungsten alloys, are preferred. In this case, the diamond particles are usually embedded in the bonding metal with the simultaneous application of heat and superatmospheric pressures. In this manner, the diamond particles are set in the bonding metal by being enveloped thereby without an actual adhesion between diamond and metal in the form of a solder being achieved. This is probably due to the fact that the known bonding materials do not or only insufficiently wet the surfaces of the diamond particles since diamonds have a peculiar surface activity characteristic.

It is one object of the present invention to provide diamond implements and tools which are characterized by a highly satisfactory bond between diamond particles and carrier surface.

Another object of the present invention is to provide a simple and effective process of producing such diamond implements and tools.

Other objects of the present invention and advantageous features thereof will become apparent as the description proceeds.

According to the present invention it has now been found that the above mentioned high surface activity of diamonds may be so influenced by the presence of the highly active titanium and ziroconium metals that known low-melting bonding metals, such as copper, noble metals, and their alloys, adhere well to the diamond particles and a true adsorption bond is formed therebetween.

Accordingly, titanium and/or zirconium are incorporated into the tool surface layer comprising diamond particles and the bonding metal. Preferred bonding metals include silver, copper, silver-copper alloys, and silver-indium alloys. While any suitable grain size of diamond may be used, a grain size exceeding about 10µ is preferred.

In certain operations, for instance, the grinding of large surfaces or particularly high-quality polishing, a very dense diamond content in the surface layer of the tool may produce excessive material removal and corresponding disfigurement of the surface layer. Since it may not be possible in the manufacture of the surface layers to reduce the diamond content substantially because the diamond particles may otherwise be floated away by the molten bonding metal and the capillary forces between the particles would become too small, there is substituted, according to one embodiment of the invention, a portion of the diamond particles by corundum particles, i.e. aluminum oxide particles. This does not substantially change the particle density of the surface layer and produces a working surface particularly useful for the grinding of layer areas or high surface polishes.

According to a preferred embodiment, a mixture of about equal parts of diamond and corundum particles may be used but this ratio may obviously be varied within large limits, depending on the particular purpose of the tool.

According to a preferred embodiment of the manufacturing method of this invention, a fluid lacquer layer containing a finely distributed powder of titanium and/or zirconium is applied to a metallic tool carrier, for instance, of steel. The lacquer may consist of any suitable natural resin, such as shellac. Before the fluid lacquer layer has completely dried, a layer of diamond particles of suitable grain size is applied to the still tacky lacquer layer, for instance, by being sprayed thereon. The diamond particle layer may have any suitable thickness, for instance, a thickness of 0.2 mm. to 0.3 mm. If a very fine-grained diamond powder is used, it may be incorporated into the lacquer layer, together with the titanium and/or zirconium powder. A like lacquer layer containing titanium and/or zirconium is then applied for instance, by spraying, to the first lacquer layer to cover the diamond particle layer. After the lacquer layers have dried, a sheet or powder layer of the bonding metal is applied over the second lacquer layer, and the bonding metal layer is heated slightly above the melting point of the bonding metal. This is done preferably after degassing and in a high vacuum furnace at approximate pressure of about $10^{-3}$ to $10^{-5}$ torr.

During melting, the bonding metal first passes through the subjacent titanium and/or zirconium layer, wets the diamond particles, passes through the first titanium and/or zirconium layer and, finally, is bonded or soldered to the metallic carrier of the tool, filling the interspaces between the diamond particles in the surface layer.

If several diamond layers are desired, another titanium and/or zirconium containing lacquer, diamond particles, titanium and/or zirconium lacquer, and bonding metal layer may be applied before heating, and so forth.

The titanium and/or zirconium addition to the surface layer greatly increases the wettability of the diamond particles and thus produces a much stronger embedding of the particles in the bonding metal. At the same time, it makes it possible to use much less bonding metal than heretofore needed and correspondingly increases the possible density of the diamond layer. Tool surface layers produced according to the present invention with an incorporation of titanium and/or zirconium have a carat ratio of 1:3 compared to conventional surfaces of this type, i.e. they contain three times the amount of diamond particles. Even if corundum particles are added, the diamond content exceeds that of conventional tool surfaces of this type.

Such tools accordingly have a much longer operating life and much higher cutting or grinding power than conventional tools. They are, therefore, particularly useful for working on very hard materials, such as oxidic ceramic articles.

The manufacturing method is particularly simple. In conventional processes, the diamond powder and bonding metal were usually pressed together in a mold and then heated under pressure in a sintering action. Also, it was difficult to apply dense diamond layers to a thin carrier because the bonding metal was insufficient in such cases. These and other disadvantages are overcome by the present method and even oddly configurated tools, grinding bodies, grinding rods, and thin discs may be very simply and efficiently covered with the surface layers according to this invention.

The very much denser diamond layer produced by the invention makes it possible to remove much more material with such a tool in the same unit of time than was possible with grinding tools of the prior art. If corundum is added, it is used up more rapidly than the harder diamond so that the diamond particle edges are always laid free and no slurring of the tool surface occurs but it retains its effectiveness. Thus, a tool surface layer with a 1:1 mixture of diamond and corundum particles has a two- to three-times longer operating life than a conventional tool with the same amount of diamonds.

The following examples will illustrate the practice of the invention:

Example 1

A steel disc of 150 mm. diameter was covered with a 0.02 mm. lacquer layer consisting of shellac, having 0.25 g. of titanium powder of a particle size between about $5\mu$ and about $30\mu$ finely distributed therethrough. After the lacquer layer was sprayed onto the disc, it was permitted to stand for 0.3 minute, at which time it was still tacky. Diamond particles having an average grain size between about $80\mu$ and about $120\mu$ were sprayed onto the tacky layer to produce a diamond layer of 0.2 mm. thickness. Thereupon, a like lacquer layer was sprayed onto the diamond layer and the same was permitted to dry. A 0.1 mm. layer of a silver-indium alloy powder was sprayed onto the dry lacquer layer, the alloy containing 90 parts silver and 10 parts indium. The disc was now placed into a vacuum furnace where it was heated for 2 minutes to a temperature of 900° C. under a vacuum of $10^{-4}$ torr.

Examples 2 and 3

The above procedure was repeated, except that a mixture of equal parts of titanium and zirconium were used in the lacquer and in another experiment with the substitution of zirconium alone for the titanium.

Examples 4 to 6

Also, these processes were duplicated with the use of silver, copper, and silver-copper alloy as bonding metals, the heating temperatures being changed, respectively, to 1000° C., 1100° C., and 800° C.

Example 7

Example 1 was repeated unchanged, but a mixture of equal parts of diamond and corundum particles was used for the brasive layer.

In place of corundum as used in the preceding example, there may be added other additive particles to reduce the number of diamond particles in the layer. Preferably such additives are added which also have abrasive properties, the edges of which, however, are more rapidly ground down and used up than those of the diamond particles. Such other additives are, for instance, silicon carbide and boron carbide. The preferred abrasive additive is corundum which, due to its light color, does not cause dark-coloring of the articles worked on. This is of particular value in the working of sintered materials composed of or containing aluminum oxide. As stated above, these additives are used in a ratio of equal parts of diamond and additive particles but, as in the case of corundum, this ratio may be varied within large limits, depending on the particular purpose of the tool and implement.

Example 8

Example 1 was repeated whereby, however, a mixture of 30 parts of diamond particles and 70 parts of silicon carbide was used for the abrasive layer.

Of course, many changes and variations in the composition of the lacquers used, in the amounts and particle size of titanium and/or zirconium metal employed as bonding aid, in the amounts and particle sizes of the diamond and, if required, aluminum oxide used as abrasive, in the composition of the bonding metal, in the bonding temperature and duration, and the like may be made in accordance with the principles set forth herein and in the claims annexed hereto.

I claim:

1. In a method of producing a tool surface layer comprising diamond particles embedded in a bonding metal, the steps of applying a fluid lacquer layer containing a finely distributed powder of at least one metal selected from the group consisting of titanium and zirconium on a metallic carrier, applying a layer of diamond particles on the fluid lacquer layer before it has dried, applying another one of said lacquer layers over the layer of diamond particles, placing a layer of said bonding metal over said other lacquer layer, and heating the layer of bonding metal above the melting point of the bonding metal.

2. The method of claim 1, wherein the bonding metal is selected from the group of silver, copper, silver-copper alloys, and silver-indium alloys.

3. The method of claim 2, wherein the bonding metal is a silver-indium alloy melting at about 890° C. and the layer of the bonding metal is heated to about 900° C.

4. The method of claim 1, comprising the additional steps of degassing the surface layer before heating and then heating in a high vacuum.

5. The method of claim 1, further comprising the step of adding corundum particles to the diamond particle layer.

6. In a method of producing a tool surface layer comprising diamond particles embedded in a bonding metal, the steps of applying a fluid lacquer layer containing a finely distributed powder of diamond particles and of at least one metal selected from the group consisting of titanium and zirconium on a metallic carrier, applying a fluid lacquer layer containing a finely distributed powder of at least one of the metals recited above, placing a layer of said bonding metal over said layer, and heating the layer of bonding metal above the melting point of the bonding metal.

7. In the method of claim 6, further comprising the step of adding corundum particles to the diamond particle layer.

8. In a method of producing a tool surface layer, the steps of applying a first fluid lacquer layer containing a finely distributed powder of at least one metal selected from the group consisting of titanium and zirconium on a metallic carrier, applying a layer of diamond particles on the fluid lacquer layer before it has dried, applying another one of said lacquer layers over the layer of diamond particles, placing a layer of a bonding metal selected from the group consisting of silver, copper, silver-copper alloys, and silver-indium alloys over said other lacquer layer, placing another one of said lacquer, diamond particles, lacquer, and said bonding metal layers over the first bonding metal layer, and heating the layers of bonding metals above the melting point of the bonding metal.

9. The method of claim 1 in which part of said diamond particles is replaced by particles of a hardness lower than that of diamond selected from the group consisting of corundum, silicon carbide, boron carbide, and aluminum oxide.

10. The method of claim 6 in which part of the diamond particles are replaced by particles of a hardness lower than that of diamond selected from the group consisting of corundum, silicon carbide, boron carbide, and aluminum oxide.

References Cited in the file of this patent

UNITED STATES PATENTS

| | | |
|---|---|---|
| 2,137,329 | Boyer | Nov. 22, 1938 |
| 2,728,651 | Hall | Dec. 27, 1955 |